United States Patent
Merrell

[11] 3,811,051
[45] May 14, 1974

[54] CAPACITANCE RESPONSIVE DETECTOR SYSTEM

[75] Inventor: Kenneth C. Merrell, Brea, Calif.

[73] Assignee: Robertshaw Controls Company, Richmond, Va.

[22] Filed: Nov. 3, 1972

[21] Appl. No.: 303,587

[52] U.S. Cl. ............................ 307/118, 340/244 C
[51] Int. Cl. ........................................... H01h 35/18
[58] Field of Search ............ 307/116, 118, 109, 125; 73/304 R, 304 C; 320/1; 340/244 C, 248 A; 324/61 P

[56] References Cited
UNITED STATES PATENTS

| | | | |
|---|---|---|---|
| 3,254,333 | 5/1966 | Baumoel | 73/304 C X |
| 3,291,149 | 12/1966 | Atkins et al | 340/244 C |
| 3,543,046 | 11/1970 | Tiffany | 307/118 |

Primary Examiner—Robert K. Schaefer
Assistant Examiner—M. Ginsburg
Attorney, Agent, or Firm—Anthony A. O'Brien

[57] ABSTRACT

A capacitance responsive detector system having charging circuits for a variable and standard capacitor and including a differential comparator which is responsive to the difference in the charging rates of the variable and standard capacitors for producing an output signal in accordance therewith. The variable capacitor can be any type of sensor or transducer which senses a property and provides a capacitance output accordingly.

26 Claims, 7 Drawing Figures

CAPACITANCE RESPONSIVE DETECTOR SYSTEM

BACKGROUND OF THE INVENTION

1. Field of the Invention

The present invention pertains to capacitance responsive detectors and more particularly to capacitance responsive detectors employing a capacitive comparison.

2. Description of the Prior Art

Capacitance responsive detecting systems have been in general use for many years in diverse applications, such as proximity detection, level detection and the like wherein a sensor or transducer develops a capacitance which is commensurate with the physical property under observation. A typical system used to detect change in the capacitance of a sensor or transducer is disclosed in U.S. Pat. No. 3,199,350 wherein the sensor, which is a level responsive type, is disposed in a resonant circuit, the impedance of which varies in accordance with the variation of the capacitance of the sensor. The resonant circuit is energized by an oscillator and the voltage thereacross is monitored as an indication of the level under observation.

Systems of the foregoing type are not useful in applications requiring high accuracy because they are subject to error caused by external factors such as variance in temperature and line voltage and have an undesirable lack of sensitivity.

Another type of system for detecting charges in the capacitance of a sensor is disclosed in U.S. Pat. No. 3,543,046 which also is a level responsive monitor but which employs a capacitance comparison between the capacitance of the sensor and that of a reference capacitor which are both cyclically charged and discharged to produce currents which are algebraically summed and conducted to a comparison device which senses the magnitude of the summed currents.

Although the capacitance comparison systems described above overcomes problems associated with prior art systems by minimizing the effect of environmental factors such as variations in temperature and line voltage, it still does not provide the accuracy and sensitivity required in many applications.

SUMMARY OF THE INVENTION

Accordingly, it is an object of the present invention to construct a capacitance responsive system employing a comparison of charging rates with respect to variable and standard capacitors.

The present invention is summarized in a capacitance responsive system including bias line means adapted to be energized by a source of power, condition responsive means for exhibiting a capacitance value which varies in accordance with variations of a predetermined condition, standard capacitance means having a predetermined capacitance value, charging means connected to the bias line means including a charging resistor in series with the condition responsive means for charging the same at a rate determined by the resistance value of the charging resistor and the capacitance value of the condition responsive means, another charging means connected to the bias line means including another charging resistor in series with the standard capacitance means for charging the same at a rate determined by the resistance value of the another charging resistor and the predetermined capacitance value of the standard capacitance means, and comparator means having a pair of inputs connected to the condition responsive means and to the standard capacitance means, respectively, and being responsive to a difference in the respective charging rates for producing an output voltage signal as an indication of such difference.

It is another object of the invention to provide a capacitance responsive system having a wide range of adaptability to accommodate a wide range of input capacitance.

Still another object of this invention is to produce a capacitance responsive system having its circuitry in monolithic integrated circuit form.

Yet another object of the invention is to construct a detector system for use with diverse physical condition responsive transducers which have a capacitance which varies in accordance with the physical condition being sensed.

Yet another object of this invention is to enable the monitoring of two discreet physical conditions by use of a single capacitance probe or transducer.

Further objects and advantages of the present invention will become apparent from the following description of the preferred embodiments taken in conjunction with the accompanying drawings.

DESCRIPTION OF THE PREFERRED EMBODIMENTS

Figure 1:
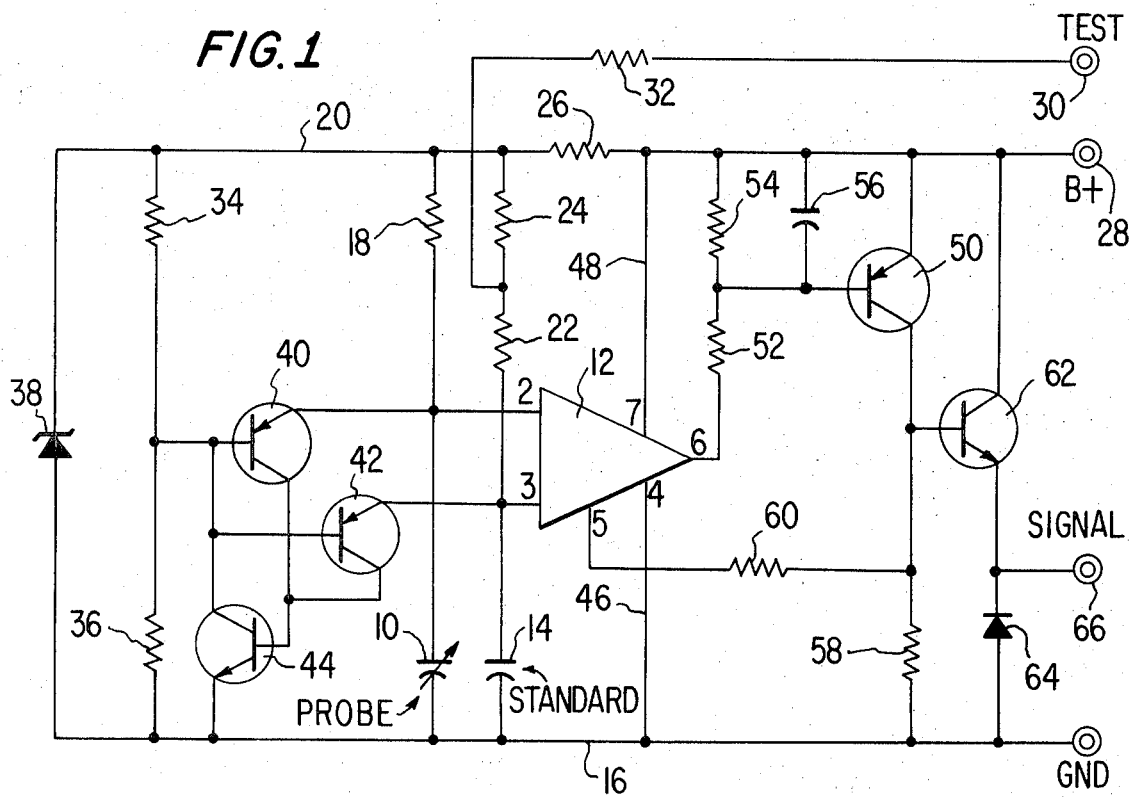
FIG. 1 is a schematic circuit diagram of one embodiment of the invention.

With reference to FIG. 1, a basic system for detecting a phyical variable is disclosed employing a probe capacitor or transducer 10 disposed to monitor the physical variable under observation. The probe capacitor or transducer 10 may be any known type of device capable of detecting a physical variable and converting it into a capacitance charge signal such as a proximity detector, level detector or the like. For exemplary purposes, the basic system will be described with respect to detecting the level of a material such as the conductive liquid coolant in a vehicle radiator or the like having the probe capacitor 10 disposed therein. Accordingly, for the case of a conductive liquid, probe capacitor 10 will usually consist of a conductor forming a plate of a capacitor and being insulated from the liquid with the liquid forming a second plate of a capacitor and being grounded such as by grounding the container for the liquid. Probe capacitor 10 has its ungrounded plate connected to an inverting input terminal 2 of a general purpose integrated circuit differential amplifier 12. A standard capacitor 14 is disposed between a non-inverting input terminal 3 of the differential amplifier 12 and ground 16. The probe capacitor 10 and the standard capacitor 14 each have a charging circuit in series therewith, the charging circuit for probe capacitor 10 including a resistor 18 connected to bias line 20, and the charging circuit for the standard capacitor 14 including a pair of series resistors 22 and 24 likewise connected to bias line 20. Bias line 20 is connected through a current limiting resistor 26 to a voltage supply terminal 28 which along with ground 16 is adapted to receive the positive and negative terminals, respectively, of a direct current voltage source (not shown). A test terminal 30 is connected to the junction between charging resistors 22 and 24 via resistor 32.

A discharge network for the probe capacitor 10 and the standard capacitor 14 includes a voltage divider network formed from a pair of resistors 34 and 36 which are energized from bias line 20 and which have a voltage regulating zener diode 38 in shunt thereacross. A pair of transistors 40 and 42 having commonly connected bases and collectors have their emitters connected to the probe capacitor 10 and the standard capacitor 14, respectively, and their bases connected to a junction between voltage dividing resistors 34 and 36. The commonly connected collectors of transistors 40 and 42 are joined to the base of a transistor 44 whose collector-emitter circuit is in shunt across resistor 36.

The general purpose integrated circuit differential amplifier 12 has a pair of biasing terminals indicated as 4 and 7 which are connected to ground 16 and battery terminal 28 via lines 46 and 48, respectively, and an output terminal 6 joined to the base of a transistor 50 through a resistor 52. The base-emitter circuit of transistor 50 has a parallel resistor 54 and capacitor 56 network in shunt thereacross while the emitter-collector circuit of transistor 50 is disposed between voltage supply terminal 28 and ground 16 through a resistor 58. A positive feedback line which includes resistor 60 extends from the junction of the collector of transistor 50 and resistor 58 to terminal 5 of the differential amplifier 12.

An output driver transistor 62 has its collector and emitter circuit connected across the voltage supply terminal 28 and ground 16 through the intermediary of a protective diode 64 while the base is connected to the collector of transistor 50. An output signal terminal 66 is connected to the junction of the emitter of transistor 62 and protective diode 64.

In the operation of the system of FIG. 1, the probe capacitor 10 will be disposed in a material such as the liquid coolant in a radiator of a vehicle. A switch (not shown), such as the ignition switch of the vehicle, may be utilized to selectively energize the system from a suitable voltage source such as the vehicle battery.

When the system is initially energized, all of the transistors are non-conducting and the probe capacitor 10 and standard capacitor 14 are in an uncharged state. Probe capacitor 10 immediately begins to receive charging current from the voltage source connected to terminal 28 through charging resistor 18 and simultaneously, the standard capacitor 14 begins to be charged through charging resistors 22 and 24. Both probe capacitor 10 and standard capacitor 14 charge exponentially until either or both charges to a voltage level which exceeds the voltage applied to the base of transistors 40 and 42 by the voltage divider network including resistors 34 and 36 regulated by zener diode 38 to thereby forward bias either or both transistors 40 and 42 into conduction. Conduction of either of transistors 40 and 42 causes transistor 44 to also become forward biased into conduction which instantaneously causes whatever one of transistors 40 and 42 which previously may have been non-conductive to assume a forward bias condition thereby becoming conductive. The above-described initiation of conduction in transistors 40, 42 and 44 occurs in a substantially simultaneous fashion to thereby enable the simultaneous discharge of both the probe capacitor 10 and the standard capacitor 14, with the discharge circuit for probe capacitor 10 including the emitter-base circuit of transistor 40 in series with the collector-emitter circuit of transistor 44 as parallelled by the emitter-collector circuit of transistor 40 in series with the base-emitter circuit of transistor 44 and the discharge circuit for the standard capacitor 14 including the emitter-base circuit of transistor 42 in series with the collector-emitter circuit of transistor 44 being parallelled by the emitter-collector circuit of transistor 42 in series with the base-emitter circuit of transistor 44. During the discharge, transistor 44 is operating at saturation thereby reducing the voltage across resistor 36 to the collector-emitter saturation voltage of transistor 44 and assuring nearly complete discharge of probe capacitor 10 and standard capacitor 14. Once discharged, transistor 40, 42 and 44 cease to conduct and probe capacitor 10 and standard capacitor 14 restart their charging cycle. The time or period between discharge cycles is determined by the smaller of either the probe capacitor 10 or the standard capacitor 14 for the case where the resistances of each charging circuit are of equal value, and may be expressed:

$$\text{Period} = RC \left( \text{natural logarithm} \frac{\text{regulated voltage}}{\text{regulated voltage} - \text{reference voltage}} \right)$$

where $R$ is equal to the resistance of the charging resistor; $C$ is equal to the smaller of either the probe capacitance or the standard capacitance; the regulated voltage is established by zener diode 38; and the reference voltage is established at the junction of resistors 34 and 36.

The charging rates of the probe capacitor 10 and the standard capacitor 14 are sensed and compared by the general purpose integrated circuit differential amplifier 12. If the level of the liquid coolant in the radiator is higher than the level at which an indication is desired, the capacitance value of probe capacitor 10 will be greater than the capacitance value of standard capacitor 14. This results in a charging rate for the probe capacitor 10 which is less than the charging rate of the standard capacitor 14, and the differential amplifier 12 will produce a positive output signal in response thereto. Transistors 50 and 62 are not responsive to this positive output signal and remain non-conductive and accordingly, output signal terminal 66 will remain in an unenergized state as an indication of adequate liquid level in the radiator.

If the level of the liquid in the radiator has receded to a level less than or equal to the level at which an indication is desired, the capacitance value of probe capacitor 10 will then be smaller than the capacitance value of the standard capacitor 14 and the charging rate of probe capacitor 10 will exceed that of standard capacitor 14. The differential amplifier 12 will produce a negative output signal at terminal 6 in response thereto which is transferred through resistor 52 to the base of transistor 50 to establish current flow through resistor 54 and thereby forward bias the emitter-base junction of transistor 50 causing it to assume a conductive state. The resultant current flow through its emitter-collector circuit and resistor 58 in series therewith forward biases transistor 62 into conduction in its saturation region. The conduction of transistor 62 provides a low liquid level indicating voltage output signal across diode 64 at signal output terminal 66 having a magnitude equal to the supply voltage applied at terminal 28 minus the collector-emitter saturation voltage of transistor 62. This voltage output signal may power an indicator or may be utilized for control purposes.

The response of differential amplifier 12 is reasonably slow, and as a result, some integration of the negative output signal therefrom is effected which is further aided by capacitor 56 such that when transistor 50 becomes conductive in response to the negative output signal it remains on through the discharge cycle so as not to cause pulses to appear in the output voltage of transistor 62.

To assure bistable switching action of the output voltage signal at terminal 6 of differential amplifier 12, positive feedback of the voltage across resistor 58 is provided by resistor 60. As the negative output voltage signal from the differential amplifier 12 starts to increase, resistor 60 effectively unbalances the input of the differential amplifier 12 to cause bistable action. Resistor 58 provides a low impedance path for the base of transistor 62 to assure good cut-off.

The system of FIG. 1 may be checked at any time for proper circuit operation by selectively shorting test terminal 30 to ground 16 such as through an external switch (not shown). Shorting terminal 30 to ground reduces the charging potential available to standard capacitor 14 thereby effecting a reduction in its charging rate such that the charging rate of the probe capacitor 10 is now the greater charging rate as between the two. The differential amplifier 12 will accordingly produce a negative output signal at terminal 6 which causes transistors 50 and 62 to conduct as described above and thereby produce an output signal at terminal 66 simulating a low liquid level condition as an indication of proper circuit operation.

Figure 2:
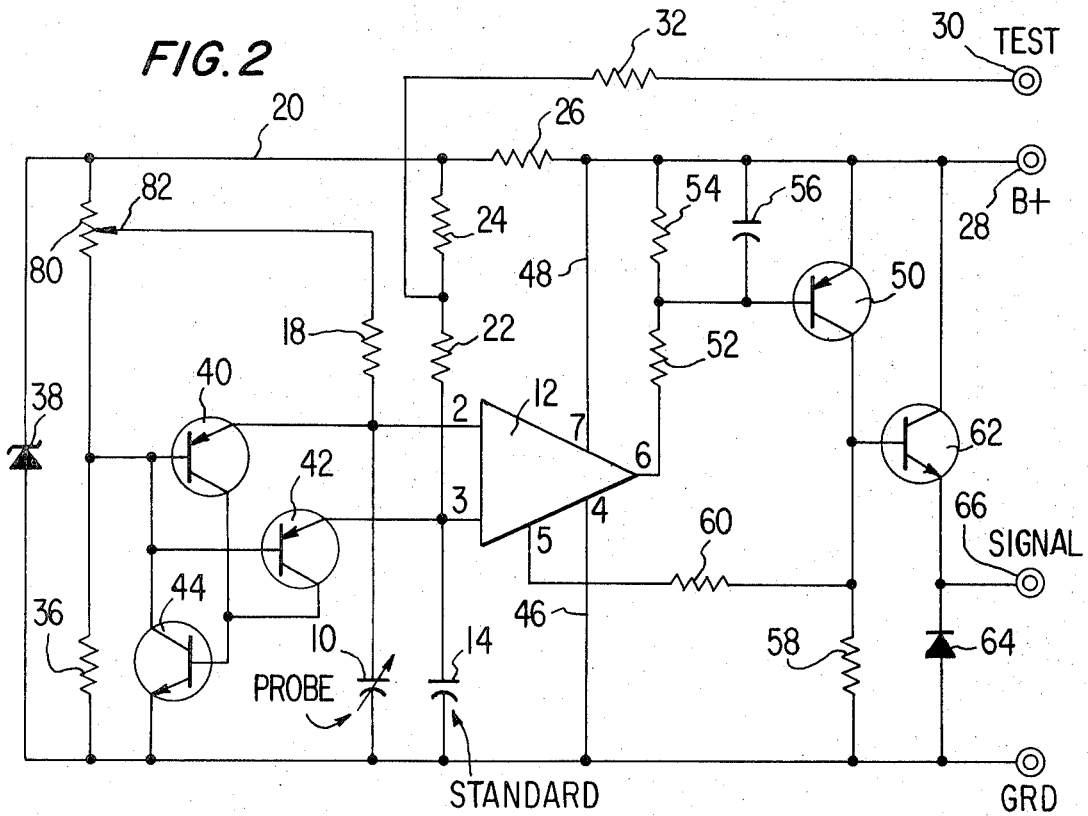
FIG. 2 is a schematic circuit diagram of another embodiment of the invention having an adjustable operating point.

The system of FIG. 2 is generally intended to be used to detect the level of non-conductive materials such as lubricating fluids in vehicles, liquid petroleum, gas and the like. For such applications, the probe capacitor 10 may take the general configuration of a pair of spaced apart capacitive plates having the fluid being monitored therebetween as the dielectric with the overall capacitance of probe capacitor 10 varying in accordance with the level of the liquid between the plates. Since the range of capacitance change of the probe 10 associated with the non-conductive liquid is significantly less than that associated with the conductive liquid probe, the embodiment of FIG. 2 is an improvement over the embodiment of FIG. 1 in the inclusion of an adjustability feature. As shown, the voltage divider resistor 34 in FIG. 1 associated with the capacitor discharging network has been replaced in FIG. 2 with a potentiometer 80 having a wiper 82. The charging resistor 18 for probe capacitor 10 is now connected to bias line 20 through the wiper 82 of potentiometer 80 rather than being directly connected thereto as in FIG. 1. The remainder of the circuitry of FIG. 2 is otherwise identical to that of FIG. 1.

In the operation of the embodiment of FIG. 2, the probe capacitor 10 will be disposed in the material to be monitored such as a non-conductive lubricating liquid in a vehicle. The wiper 82 of potentiometer 80 will be set in position to select a total resistance value for the charging circuit of the probe capacitor 10 such that with its reduced range of capacitance variation due to the variation in the liquid level being monitored, the operating point of the system, that is, the point at which the differential amplifier 12 provides a negative output signal at terminal 6, will occur when the level of the liquid being monitored is at or near the mid-point of the capacitor probe 10. In addition, due to component tolerances and component values in the system which might change with age, the setting of wiper 82 may have to periodically be adjusted to ensure that the operating point of the system remains at or near the mid-point of the probe capacitor 10. The operation of the embodiment of FIG. 2 is otherwise identical to that of the embodiment of FIG. 1.

Figure 3:
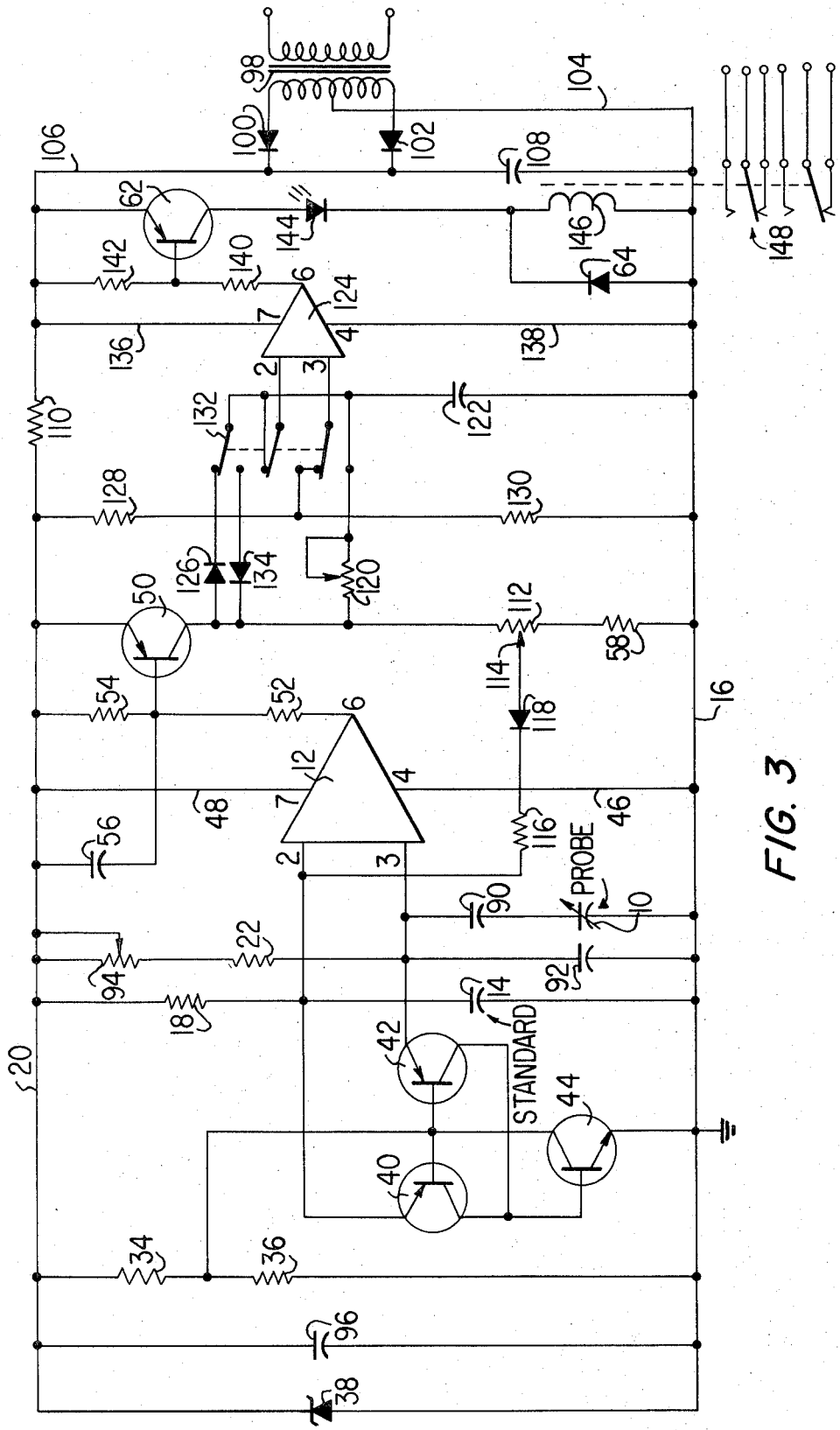
FIG. 3 is a schematic circuit diagram of another embodiment of the invention employing alternating current energization and a time delay network.

The system of FIG. 3 is an improvement of the basic system of FIG. 1 in that it encompasses time delay relay control of the liquid level indication and it is adapted to be powered by an alternating current supply. As shown, the probe capacitor 10 and the standard capacitor 14 have been reversed with respect to the input terminals of the differential amplifier 12. In addition, probe capacitor 10 is now connected to the non-inverting input terminal 3 of the differential amplifier 12 through direct current blocking capacitor 90 while additionally having another capacitor 92 in shunt across probe capacitor 10 and capacitor 90. Rearrangement of the probe capacitor 10 and the standard capacitor 14 relative to the input terminals of differential amplifier 12 makes the system responsive to the build-up of liquid level rather than the fall-off of liquid level as in FIGS. 1 and 2.

The charging circuit for the probe capacitor 10 and associated capacitors 90 and 92 has been modified to include a series disposed adjustable resistor 94 connected to bias line 20. In addition, a ripple filter capacitor 96 has been included in shunt across zener diode 38 due to the fact that the system of FIG. 3 is adapted to be powered from an alternating current source (not shown) connectable at the primary winding terminals of a transformer 98. The secondary winding of transformer 98 has its terminals connected to the cathodes of a pair of diodes 100 and 102 which have their anodes connected in common. The secondary winding of transformer 98 is also center tapped to ground 16 via line 104 to thereby form a full wave rectifier with diodes 100 and 102, the rectifier output indicated at point 106 shunted to ground 16 through ripple filter capacitor 108 and connected to bias line 20 through current limiting resistor 110.

The collector load for transistor 50 now includes resistor 58 and potentiometer 112 in series therewith and having a wiper 114. A positive feedback circuit disposed between inverting terminal 2 of the differential amplifier and wiper 114 of potentiometer 112 includes a resistor 116 and diode 118 in series.

A time delay circuit is interposed between the collector of transistor 50 and the base of transistor 62 including an adjustable resistor 120 and series capacitor 122 disposed between the collector of transistor 50 and ground 16, with the resistor capacitor junction connected to inverting terminal 2 of differential amplifier 124. The time delay circuit additionally includes a diode 126 in shunt across resistor 120. A voltage divider network including a series pair of resistors 128 and 130 is disposed between bias line 20 and ground 16 with the junction point between these resistors connected to non-inverting input terminal 3 of differential amplifier 124. A reversing switch assembly 132 which includes three single-pole double-throw sections having commonly ganged armatures, has a first armature selectively connecting either diode 126 or diode 134 which is poled opposite to diode 126 across resistor 120. A second armature of switch 132 selectively connects the inverting input terminal 2 of differential amplifier 124 to either the junction point formed by resistor 120 and capacitor 122 or the junction point formed by voltage divider resistors 128 and 130. The third armature of switch 132 selectively connects the non-inverting input terminal of differential amplifier 124 to the junction of voltage divider resistors 128 and 130 or the junction formed by resistor 120 and capacitor 122.

Differential amplifier 124, which is biased at terminal 7 and grounded at terminal 4 via lines 136 and 138, respectively, has its output at terminal 6 connected to the base of transistor 62 through resistor 140. Transistor 62 has a bias resistor 142 across its base-emitter circuit while having its emitter-collector circuit disposed between point 106 and ground 16. A light emitting diode 144 and the coil 146 of a relay having associated contacts 148 are serially disposed in the collector circuit of transistor 62 with relay coil 146 having protective diode 64 connected thereacross.

In the operation of the embodiment of FIG. 3, when an alternating current source is applied to the primary winding of transformer 98, it is rectified by diodes 100 and 102 and filtered by capacitor 108 with the resulting output at point 106 applied to the charging circuits for the probe capacitor 10 and the standard capacitor 14 through current limiting resistor 110. The voltage between bias line 20 and ground 16 has ripple content which is smoothed out by filter capacitor 96. The initial application of the alternating current source to the primary of transformer 98 immediately initiates the flows of charging current to the probe capacitor 10 and the standard capacitor 14, respectively. The presence of the direct current blocking capacitor 90 and capacitor 92 in association with probe capacitor 10 changes the total capacitance seen by the charging circuit, substantially due to the presence of capacitor 92. This enables the use of a lower resistance charging circuit which in this case includes resistors 22 and 94 with resistor 94 being adjustable for the purpose of establishing the operating point of the system at or near the mid-point on the capacitor probe. Since the probe capacitor 10 and the standard capacitor 14 have been reversed with respect to the input terminals of the differential amplifier 12, it will now only produce a negative output signal at terminal 6 when the charging rate of the capacitor network including probe capacitor 10 is less than the charging rate of standard capacitor 14 which occurs during the build-up of liquid being monitored. The negative output voltage signal from differential amplifier 12 initiates conduction of transistor 50 in its saturation region with its emitter-collector current flow establishing a voltage across resistor 58 and potentiometer 112, a part of which is fed back via wiper 114 to inerting input terminal 2 of differential amplifier 12 through diode 118 and resistor 116. Diode 118, which is poled to prevent current flow from the standard capacitor 14, becomes forward biased through potentiometer 112 and resistor 58 and provides an additional charging path for standard capacitor 14. The extent of the contribution of charging current to the standard capacitor 14 from the positive feedback network is proportional to the dead band, that is, a greater feedback voltage produced by moving potentiometer wiper 114 in an upward direction as shown in FIG. 3 means a wider dead band, and accordingly, a greater amount of increase in the charging rate for the capacitor network which includes probe capacitor 10 before the differential amplifier will cease to produce a negative output voltage signal.

The output voltage on the collector of transistor 50 when it is rendered conductive by the negative pulse from differential amplifier 12 is also applied to a time delay network including adjustable resistors 120 and capacitor 122 with the output of the time delay network across capacitor 122 being selectively applied to either input terminals 2 or 3 of differential amplifier 124 in accordance with the armature position of switch 132, with the application of the output switching pulse from differential amplifier 12 being delayed in accordance with the charging rate of capacitor 122. The opposite poled diodes 126 and 134 are present to provide a time delay in one direction only such that the switch arrangement 132. With armature position as shown, enables a fast charge of capacitor 122 via diode 126 and a slow discharge of capacitor 122 via adjustable resistor 120, while if the switch contacts are operated to their other position (not shown), a slow charge of capacitor 122 occurs through adjustable resistor 120 and a fast discharge of capacitor 122 occurs through diode 134. The presence of the switch 132 enables a reversal of the operational mode of the system (i.e., an increase in probe capacitance causing the probe relay to become energized or an increase in probe capacitance causing the probe relay to become de-energized) to thereby enable the selection of fail-safe operation for any of the diverse applications to be encountered. The voltage across capacitor 122 of the time delay network is compared to the voltage across resistor 130 by differential amplifier 124 which produces a negative output signal at terminal 6 when the voltage across capacitor 122 exceeds that across resistor 130. The negative output signal from the differential amplifier 124 controls the operational state of transistor 62 and accordingly, relay contacts 148 controlled by relay coil 146 in the collector circuit of transistor 62.

The light emitting diode 144 in the collector circuit of transistor 62 is normally not exposed during use of the system and is present for the purpose of calibrating and adjusting the system by providing a visual indication as to the energization state of the relay coil 146.

Figure 4:
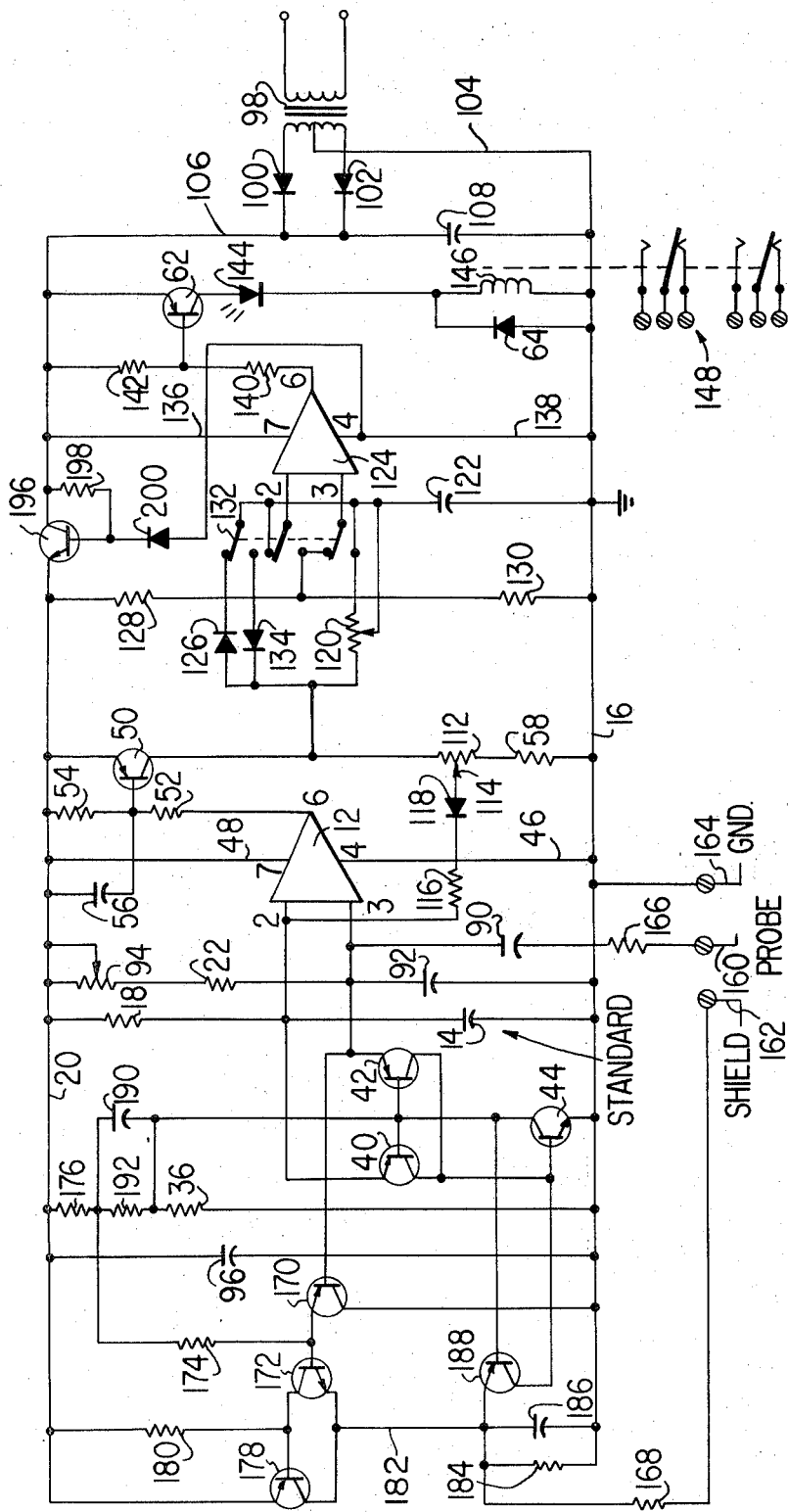
FIG. 4 is a schematic circuit diagram of another embodiment of the invention which is similar to that of FIG. 3 for use with a remotely mounted condition sensing probe.

The system of FIG. 4 is an improvement over the system of FIG. 3 and is particularly adapted for use with capacitor probes and transducers which are remotely mounted through the intermediary of triaxial cable. In this embodiment, the remotely located probe capacitor (not shown) is connected to the circuitry of the system through a triaxial cable having an inner conductor 160, an inner shield 162 which surround the inner conductor 160 and is insulated therefrom, an an outer shield 164 which encompasses the inner shield 162 and is insulated therefrom and which is connected to ground 16. The inner conductor 160 of the triaxial cable is connected to capacitor 90 through an isolating resistor 166. The inner sheild 162 of the triaxial cable is connected through an isolating resistor 168 to a shield driving circuit including a unity gain amplifier. The unity gain amplifier includes a pair of complementary transistors 170 and 172 with the base-collector circuit of transistor 170 connected between input terminal 3 of differential amplifier 12 and ground 16 and the emitter being connected to the base of transistor 172 with the junction point therebetween contacting bias line 20 through a series pair of resistors 174 and 176. The emitter and collector of transistor 172 are connected to the collector and base, respectively, of a driver transistor 178 which also has a bias resistor 180 across its base-emitter circuit and connected to bias line 20. The output of the unity gain amplifier, indicated at 182, has a load to ground 16 which includes a resistor 184 and capacitor 186 in parallel, output 182 also being electrically coupled to the inner shield 162 of the triaxial cable through isolating resistor 168.

A switching transistor 188 has its base and collector connected to the collector and base, respectively, of transistor 44 and its emitter is directly coupled to output 182 of the unity gain amplifier.

The discharge circuit for the standard capacitor 14 and the probe capacitor (not shown) and associated capacitors 90 and 92 includes transistors 40, 42 and 44 as in FIG. 3 with the junction point between the bases of transistors 40 and 42 connected to a capacitor 190 which shunts resistor 192 associated with the voltage divider including resistors 176, 192 and 36 for the discharge circuit.

The voltage regulating zener diode 38 of FIG. 3 has been replaced with a series voltage regulator which includes transistor 196 having its collector-emitter circuit between output point 106 of the full wave rectifier and bias line 20. The base of transistor 196 has a bias resistor 198 coupled to point 106 and is additionally grounded through a zener diode 200.

In the operation of the embodiment of FIG. 4, as the alternating current power is initially applied to the primary winding of transformer 98 to thereby initiate the charging of the probe capacitor and standard capacitor 14, respectively, transistor 188 is intially off and transistors 170, 172 and 178 of the unity gain amplifier are initially in a conductive state. The unity gain amplifier has a low impedance output, indicated at 182, which develops a signal which is equal in magnitude and in phase with the increasing signal at non-inverting terminal 3 of differential amplifier 12 due to the charging of the capacitors associated therewith. The output of the unity gain amplifier is applied to the inner shield 162 of the triaxial cable connected to the remotely located probe capacitor (not shown) through isolating resistor 168. Load resistor 184 and capacitor 186 are present in the output circuit of the unity gain amplifier to ensure that it always has a load.

When transistors 40, 42 and 44 turn on to initiate the discharge cycle, the junction point of the base of transistors 40 and 42 becomes effectively zero volts due to transistor 44 operating at saturation, as does the junction point between resistors 176 and 192 due to the presence of capacitor 190, thereby removing the forward bias before transistors 170 and 172 and turning off the unity gain amplifier.

Almost simultaneously with the initiation of conduction in transistors 40, 42 and 44, transistor 188 becomes conductive in response to conduction through transistor 44 and establishes a discharge path for the voltage maintained at output point 182 of the unity gain amplifier due to capacitance between the inner shield 162 and the grounded outer shield 164. The turning off of the unity gain amplifier when transistor 188 turns on prevents a short circuit to ground through the emitter-collector circuits of transistors 178 and 188 and the base-emitter circuit of transistor 44.

As mentioned above, the voltage regulating zener diode 38 of FIG. 3 has been replaced by a series voltage regulating arrangement including transistor 196 and zener diode 200 which regulates the voltage between bias line 20 and ground due to the fact that the base-emitter junction voltage of transistor 196 is always in a forward bias state and remains constant (a typical value for the forward biased base-emitter junction voltage would be in the order of 0.6 volts) and when combined with the voltage across zener diode 200 provides a total regulated output.

Figure 5:
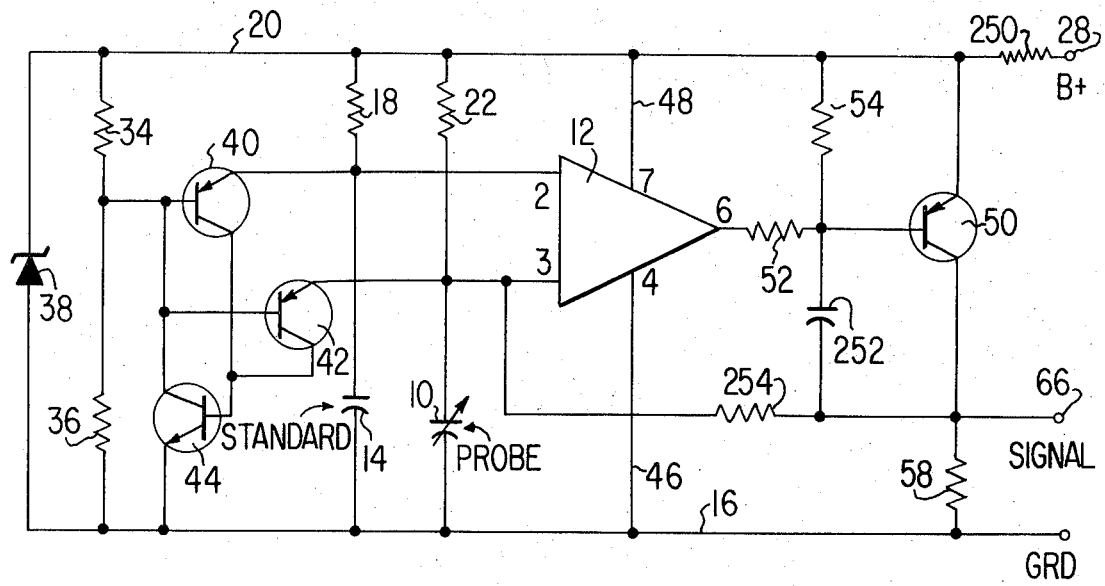
FIG. 5 is a schematic circuit diagram of another embodiment of the invention which produces an output voltage which is proportional to the change of capacitance at the input.

The embodiment of FIG. 5 is an improvement of the basic embodiment of FIGS. 1 and 2 which includes modifications to enable the generation of an analog direct current voltage output signal proportional to a change in probe capacitance. As shown, the probe capacitor 10 and the standard capacitor 14 are connected to input terminals 3 and 2, respectively, of the differential amplifier 12 thereby making the system responsive to the build-up of liquid levels. The charging circuits and the discharging circuits for the capacitor probe 10 and the standard capacitor 14 have already been described with regard to FIGS. 1 and 2 and will not be discussed further.

The output of the differential amplifier 12 is coupled to the base of a transistor 50 through a resistor 52, transistor 50 having its emitter-collector circuit disposed between the bias line 20 and ground 16 through the intermediary of a load resistor 58 with signal output terminal 6 connected to the junction point between the collector of transistor 50 and resistor 58. A direct current source (not shown) is coupled to bias line 20 and ground 16 through the intermediary of a current limiting resistor 250 disposed between bias line 20 and terminal 28.

The base-collector circuit of transistor 50 has a capacitor 252 in shunt thereacross. A negative feedback circuit disposed between the collector of transistor 50 and input terminal 3 of the differential amplifier 12 includes a resistor 254.

In the operation of the embodiment of FIG. 5, as the capacitance of probe capacitor 10 increases (to thereby decrease its charging rate) the output differential amplifier 12 decreases, thereby turning transistor 50 on when it has decreased to a negative value in accordance with the charging rate of probe capacitor 10 becoming less than that of standard capacitor 14. As transistor 50 turns on, the voltage across resistor 58 starts to increase due to the tendency of the collector of transistor 50 to substantially assume the voltage of bias line 20 as transistor 50 nears saturation. The increasing voltage across resistor 50 is transferred via feedback resistor 254 back to input terminal 3 of differential amplifier 12 thereby effecting negative feedback and acting as an additional charging source for probe capacitor 10 resulting in a flat direct current output voltage at the signal output terminal 6. Capacitor 252 is present to minimize any ripple in the resulting output signal.

Figure 6:
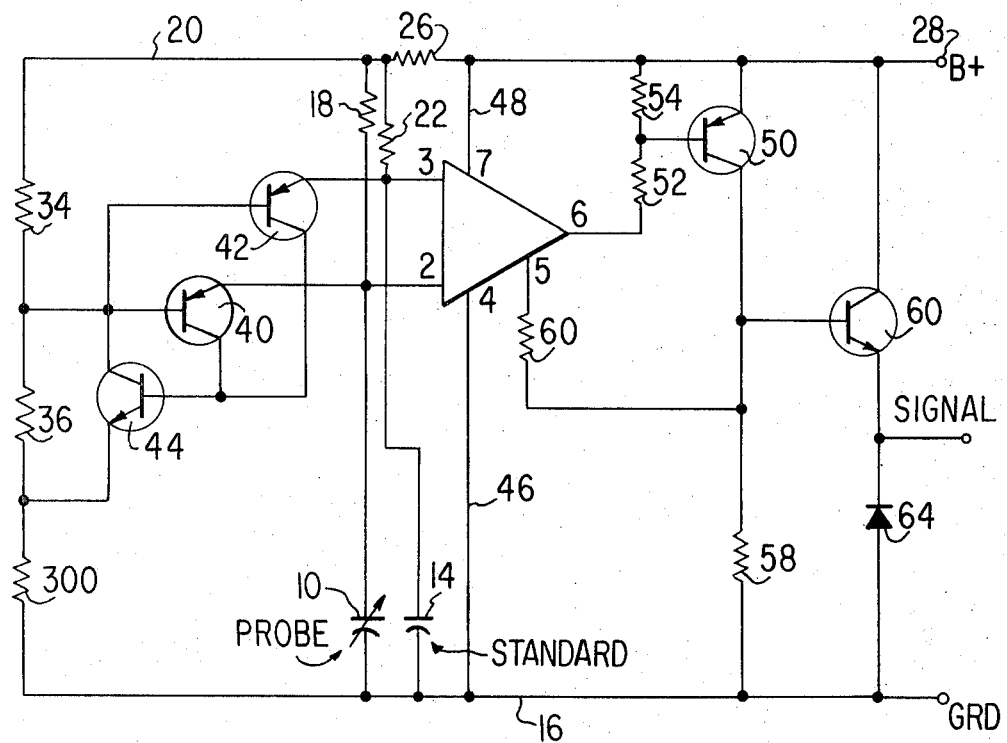
FIG. 6 is a schematic circuit diagram of another embodiment of the invention which may readily be manufactured in monolithic integrated circuit form.

The embodiment of FIG. 6 is an improvement of the basic embodiments disclosed in FIGS. 1 and 2 in that it is readily adaptable to manufacture in monolithic integrated circuit form. The system includes a resistor 300 located in the discharge path for the probe capacitor 10 and the standard capacitor 14. The presence of resistor 300 is beneficial in that it enables the elimination of both zener diode 38 and capacitor 56 (as shown in FIGS. 1 and 2) from the circuit resulting in a considerable cost and space saving.

In the operation of the FIG. 6 embodiment, the charging and discharging of probe capcitor 10 and standard capacitor 14 occur as in the basic circuit of FIG. 1 with the exception that as the probe capacitor 10 and standard capacitor 14 discharge through resistors 40, 42 and 44 to ground 16, the discharge currents must pass through resistor 300 interposed between the discharge circuit and ground 16. The presence of resistor 300 prevents probe capacitor 10 and standard capacitor 14 from completely discharging such that their lowest voltage is now very near the threshold operation level for the differential amplifier 12 which enables differential amplifier 12 to remain in its linear operating region. As a result, voltage regulation such as provided by zener diode 38 in FIG. 1 becomes unnecessary and zener diode 38 may accordingly be eliminated in FIG. 6 resulting in a significant saving with respect to monolithic integrated circuit manufacture of this embodiment. In addition, differential amplifier 12 now operates at a much greater duty cycle (as opposed to its operation in the FIG. 1 embodiment) which is reflected in its output waveform, having far less ripple content, thereby allowing the eliminating of capacitor 56 (shown in FIG. 1) resulting in a significant space saving in the monolithic integrated circuit.

Figure 7:
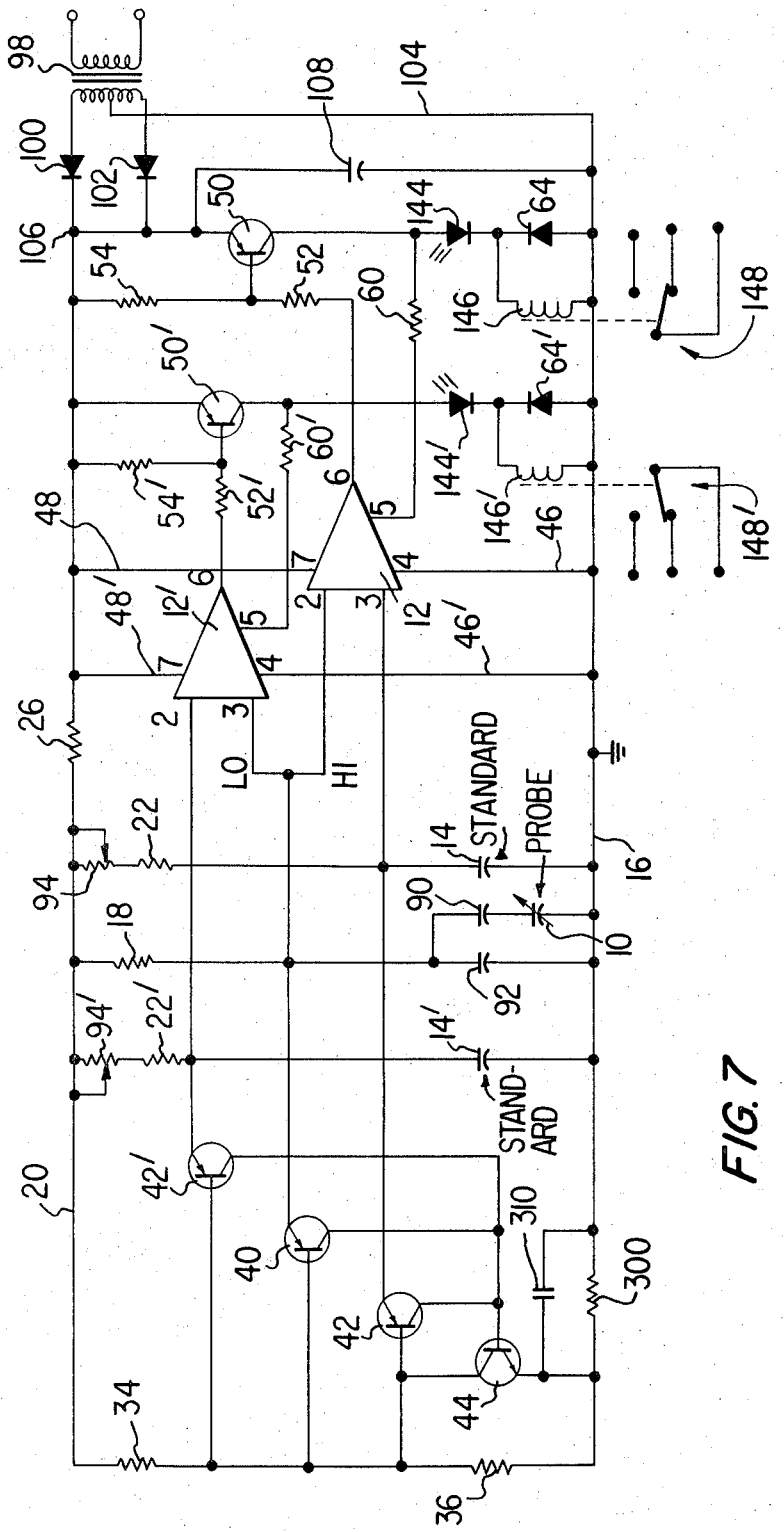
FIG. 7 is a schematic circuit diagram of another embodiment of the invention employing a single probe and having the capability of providing two separate condition responsive indications.

The embodiment of FIG. 7 is a duplex level indicating system which incorporated features from FIGS. 3 and 6 in a single circuit. As shown, the system includes a probe capacitor 10 coupled to input terminal 2 of differential amplifier 12 and input terminal 3 of differential amplifier 12' through capacitor 90 with capacitor probe 10 and capacitor 90 having capacitor 92 in shunt thereacross. This capacitor network is coupled between bias line 20 and ground through the intermediary of charging resistor 18. A pair of standard capacitors 14 and 14' are also connected between bias line 20 and ground 16 through the intermediary of charging circuits including resistor 22 and adjustable resistor 94 for capacitor 14 and resistor 22' and adjustable resistor 94' for capacitor 14'. The discharge circuit includes transistors 40, 42 and 44 along with biasing resistors 34, 36 and 300 as in FIG. 6 with the added inclusion of a capacitor 310 shunting resistor 300. In addition, an additional transistor 42' has its base and collector connected to the collector and base of transistor 44 and its emitter connected to the junction point between standard capacitor 14' and ts charging circuit as well as being connected to input terminal 2 of differential amplifier 12'. Both differential amplifiers 12 and 12' are grounded at terminal 4 via line 46 and 46' and are coupled to output point 106 of the full wave rectifier via lines 48 and 48', respectively.

The output of differential amplifiers 12 and 12' are respectively coupled to the bases of transistors 50 and 50' through resistors 52 and 52'. Transistors 50 and 50' have their emitter collector circuits connected beween point 106 and ground 16, with each collector circuit having disposed therein a light emitting diode 144 and 144' and a relay coil 146 and 146' having a diode 64 and 64' in shunt thereacross. Each relay coil 146 and 146' has a switching assembly 148 and 148' associated therewith. The system is energized by an alternating current supply as in FIG. 3 which includes a transformer 98 having a primary winding connected to the alternating current source (not shown) and having a secondary winding which is center tapped to ground via line 104. Diodes 100 and 102 and capacitor 108 complete the rectifier network as in FIG. 3.

Although the embodiments of FIGS. 3, 4 and 7 have been disclosed as powered by a transformer coupled alternating current source, these embodiments may also be powered by a direct current source by eliminating the transformer 98 and diode 102 and connecting the direct current source between the anode of diode 100 and ground 16.

Furthermore, although a negative ground is disclosed for the described circuits, it should be obvious that a positive ground arrangement may also be utilized with appropriate modification of component values from those in the negative ground circuits.

In the operation of the embodiment of FIG. 7, the charging rate of the capacitor network including the probe capacitor 10 is compared to the charging rate of standard capacitor 14 and standard capacitor 14'. Due to the presence of the additional standard capacitor 14', the discharge network for the capacitors includes an additional transistor 42' which functions in the same manner as transistor 42 such that whenever either of transistors 40, 42 and 42' initially becomes conductive all transistors will then become conductive including transistor 44 to enable the capacitors to discharge through resistor 300 and capacitor 310 to ground 16. The presence of capacitor 310 keeps the emitter voltage at transistor 44 from escalating to a high initial value due to the occurrance of an initial current spike during turn on of the discharge network.

Since differential amplifiers 12 and 12' have the capacitor network which includes capacitor probe 10 connected to input terminals 2 and 3, respectively, differential amplifier 12 provides an output in response to a decrease in liquid level to a certain point whereas differential amplifier 12' provides an output in response to an increase in liquid level to a certain point. Upon the occurrence of an output signal at output terminal 6 of either of the differential amplifiers 12 and 12', conduction will be initiated in transistor 50 or 50' in accordance with the location of the output signal to thereby energize the coil of a relay 146 or 146' having switch contacts 148 and 148', respectively. Positive feedback is provided via resistors 60 and 60' to assure bistable switching action of the output voltage signal from the differential amplifiers 12 and 12'.

A plurality of systems have been disclosed which are advantageous in that they are highly sensitive and capable of great accuracy over a wide range of capacitance variation, and are versatile in that they can be utilized to monitor any number of diverse physical conditions when used in conjunction with the appropriate sensor or transducer.

Inasmuch as the present invention is subject to many variations, modification and changes in detail, it is intended that all matter contained in the foregoing description or shown in the accompanying drawings shall be interpreted as illustrative and not in a limiting sense.

What is claimed is:

1. A capacitance responsive detector system comprising:
    bias line means adapted to be energized by a source of power;
    condition responsive means for exhibiting a capacitance value which varies in accordance with variations of a predetermined condition;
    standard capacitance means having a predetermined capacitance value;
    charging means connected to said bias line means including a charging resistor in series with said condition responsive means for charging the same at a rate determined by the resistance value of said charging resistor and the capacitance valve of the condition responsive means;
    another charging means connected to said bias line means including another charging resistor in series with said standard capacitance means for charging the same at a rate determined by the resistance value of said another charging resistor and the predetermined capacitance value of the standard capacitance means; and
    differential amplifier comparator means having a pair of inputs, including an inverting input and a non-inverting input, connected to said condition responsive means and to said standard capacitance means, and being responsive to a difference in the respective charging rates for producing an output voltage signal as an indication of such difference.

2. The invention of claim 1 wherein one of the charging means includes another resistor in series with its charging resistor, and a test line extending from the junction point of the resistors.

3. The invention of claim 1 including a discharge means for the condition responsive means and standard capacitance means comprising first, second and third transistors, with the first and second transistors having their emitter-collector circuits connected between the respective inputs of the comparator means and the bias line means through the base-emitter circuit of the third transistor which has its collector joined to the bases of the first and second transistors.

4. The invention of claim 1 wherein the differential amplifier comparator means produces an output voltage signal having a positive or negative polarity in accordance with the relative values of charging rates at its respective intputs, and further including means responsive to the output voltage signal of a given polarity from the differential amplifier comparator means for producing a condition indicating signal.

5. The invention of claim 4 wherein the standard capacitance means is connected to the non-inverting input and the condition responsive means is connected to the inverting input, and wherein the differential amplifier comparator means produces said output voltage signal of a given polarity when the charging rate of the condition responsive means exceeds that of the standard capacitance means.

6. The invention of claim 4 wherein the standard capacitance means is connected to the inverting input and the condition responsive means is connected to the non-inverting input, and wherein the differential amplifier comparator means produces said output voltage signal of a given polarity when the charging rate of the condition responsive means is less than that of the standard capacitance means.

7. The invention of claim 4 wherein said means responsive to the output voltage signal includes a transistor and a collector load therefor, with the emitter-collector circuit of the transistor connected to the bias line means through the collector load.

8. The invention of claim 7 further including a positive feedback network from the collector load to the differential amplifier comparator means.

9. The invention of claim 8 wherein the positive feedback network includes a series resistor and diode.

10. The invention of claim 7 further including a negative feedback network from the collector load to the differential amplifier comparator means.

11. The invention of claim 10 wherein the negative feedback network comprises a resistor connected between the collector load and an input of the differential amplifier comparator means.

12. The invention of claim 1 wherein one of the charging means includes an adjustable resistor in series with the charging resistor.

13. The invention of claim 1 including a relay which is operable in response to a given polarity output voltage signal from the differential amplifier comparator means, and time delay means for delaying the operation of the relay.

14. The invention of claim 13 wherein the time delay means comprises a series resistor and capacitor, and further including another differential amplifier comparator means having a pair of inputs and an output with the voltage across the capacitor of the time delay means applied to one of the inputs and means for applying a predetermined voltage to the other input.

15. The invention of claim 1 including means for increasing the capacitance seen by one of the charging means.

16. The invention of claim 15 wherein said means for increasing the capacitance comprises a capacitor connected in shunt with said condition responsive means.

17. The invention of claim 1 including voltage regulating means connected to said bias line means.

18. The invention of claim 17 wherein the voltage regulating means comprises a zener diode.

19. The invention of claim 17 wherein the voltage regulating means comprises a transistor having its emitter collector circuit connected in series in the bias line means and a zener diode connecting the base of the transistor to the bias line means.

20. The invention of claim 1 wherein said condition responsive means is connected to the input of the differential amplifier comparator means by a conductor having an outer coaxial shield insulated therefrom.

21. The invention of claim 20 further including an inner coaxial shield disposed between and insulated from said conductor and said outer coaxial shield and means for driving the inner shield in phase with the signal applied to the input of the differential amplifier comparator means connected to the condition responsive means.

22. The invention of claim 21 wherein the means for driving the inner shield comprises a unity gain amplifier having an input connected to the input of the differential amplifier means connected to the condition responsive means and an output connected to the inner shield.

23. The invention of claim 21 including a discharge circuit for the condition responsive means and the standard capacitance means, and means responsive to discharge through said discharge circuit for discharging the potential on the inner shield.

24. The invention of claim 1 including a third charging means including a third charging resistor, a second standard capacitance means in series with said third charging resistor, and a second differential amplifier comparator means having a pair of inputs connected to the condition responsive means and the second standard capacitance means for producing a second output voltage signal in accordance therewith.

25. The invention of claim 24 including first and second relays operable in response to output voltage signals from the first and second differential amplifier comparator means, respectively.

26. The invention of claim 1 wherein the condition responsive means is a capacitor probe.

* * * * *